United States Patent
Edberg et al.

[11] Patent Number: 5,961,078
[45] Date of Patent: Oct. 5, 1999

[54] PASSIVE AXIAL VIBRATION ISOLATION SYSTEM FOR A SPACECRAFT LAUNCH VEHICLE

[75] Inventors: Donald L. Edberg, Irvine; Bruce W. Wilson, Huntington Beach, both of Calif.

[73] Assignee: McDonnell Douglas Corporation, St. Louis County, Mo.

[21] Appl. No.: 09/006,515

[22] Filed: Jan. 13, 1998

Related U.S. Application Data

[60] Provisional application No. 60/051,029, Jun. 27, 1997.

[51] Int. Cl.⁶ ...................................................... B64G 1/22
[52] U.S. Cl. ..................... 244/158 R; 248/555; 248/630; 267/151; 267/140.5
[58] Field of Search ............................. 244/118.1, 158 R; 248/583, 630, 638, 555, 550; 267/136, 158, 161, 162, 140.13, 140.14, 140.4, 140.5, 81–84; 188/371, 378–380

[56] References Cited

U.S. PATENT DOCUMENTS

| | | | |
|---|---|---|---|
| 2,359,822 | 10/1944 | Boss | 248/555 |
| 3,504,904 | 4/1970 | Irwin et al. | 267/151 |
| 4,270,393 | 6/1981 | Osborne et al. | 244/158 R |
| 4,789,118 | 12/1988 | Byers | 244/158 R |
| 5,244,170 | 9/1993 | Shekher | 244/158 R |
| 5,280,889 | 1/1994 | Amil et al. | 267/136 |
| 5,358,210 | 10/1994 | Simon et al. | 248/630 |
| 5,465,924 | 11/1995 | Schneider | 244/118.1 |
| 5,626,332 | 5/1997 | Phillips et al. | 267/140.5 |

FOREIGN PATENT DOCUMENTS

| | | | |
|---|---|---|---|
| 2017999 | 10/1971 | Germany | 248/630 |

*Primary Examiner*—Galen L. Barefoot
*Attorney, Agent, or Firm*—Brooks & Kushman P.C.

[57] ABSTRACT

An acceleration force isolator assembly for attaching a payload, such as a spacecraft or satellite, to a launch vehicle wherein axial acceleration forces on the payload are attenuated. The attachment includes an upper interface ring that is secured to the payload and a lower interface ring that is secured to the launch vehicle. Flexure of the upper interface ring provides axial compliance when axial acceleration forces are transmitted from the launch vehicle.

5 Claims, 2 Drawing Sheets

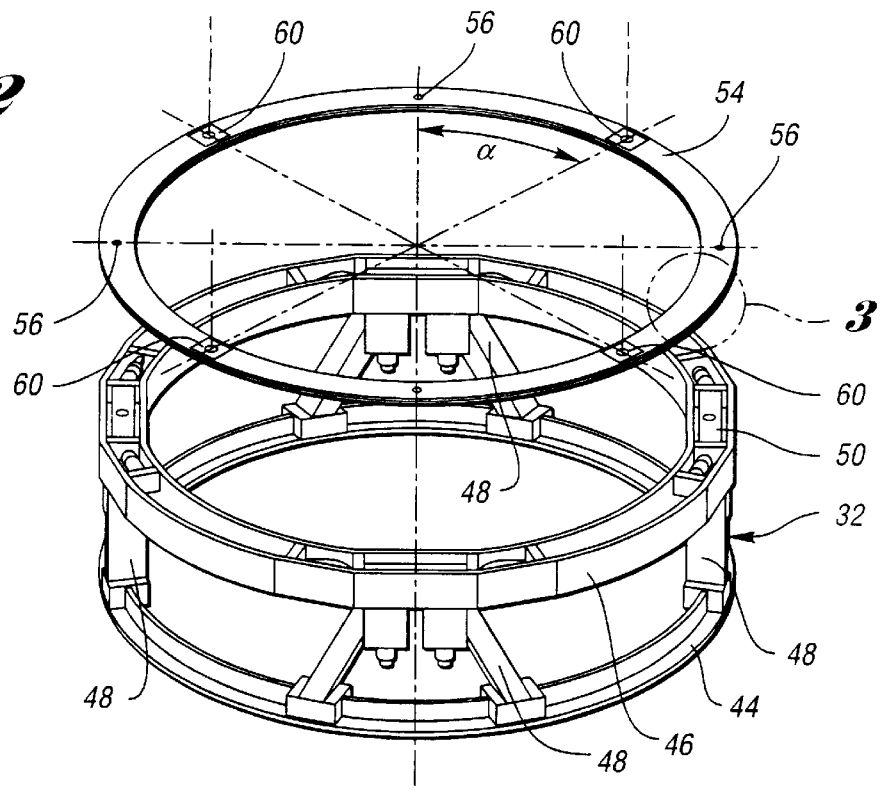
Fig. 2
Fig. 3
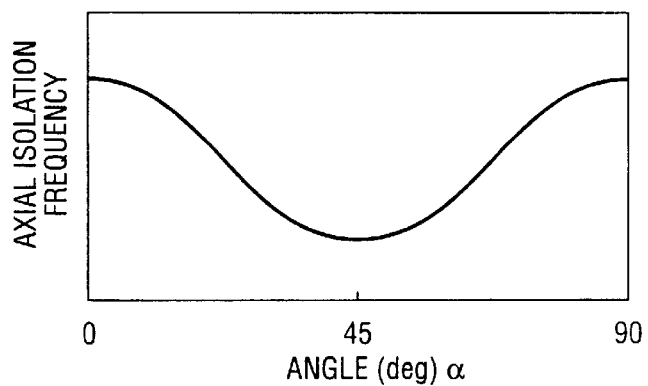
Fig. 4

PASSIVE AXIAL VIBRATION ISOLATION SYSTEM FOR A SPACECRAFT LAUNCH VEHICLE

REFERENCE TO RELATED APPLICATION

This application is based on United States Provisional Patent Application Ser. No. 60/051,029, filed Jun. 27, 1997.

TECHNICAL FIELD

The invention relates to vibration isolation systems for coupling a payload, such as a spacecraft or satellite, to a launch vehicle.

BACKGROUND ART

During launch of a payload, such as a spacecraft or satellite, the dynamic loads are a major design factor in the structural design of the payload. Launch survival often is a more difficult design problem than is the problem of ensuring operational performance in orbit. A significant percentage of payload malfunctions occur during launch, and those malfunctions are often due to vibration and acoustic loads.

A traditional design approach to enhance launch survival percentages involves structural stiffening. This approach, however, adds weight to the overall design and actually can lead to design features that are liabilities once the payload is in orbit. Although the current design techniques of providing semi-rigid payload attachment fittings for securing a payload to a launch vehicle avoids inducing lower frequency flexible body modes into the coupling structure between the launch vehicle and the payload system, they cause severe acceleration loads to be transmitted through the coupling from the engine as well as from other vibrational energy sources.

A conventional payload attachment typically provides a "hard mount" that effectively transmits all structural forces from the launch vehicle into the payload over a wide frequency band. A "whole-spacecraft" isolation system, in contrast, would replace the hard mount with a soft mount that would filter many of the forces of the frequency spectrum.

Most payloads are cantilevered on the launch vehicle and are attached to the launch vehicle only at the base of the spacecraft. The isolation problem thus is augmented because of the large ratio of center-of-gravity height to attachment width. Reduction of the axial attachment stiffness will introduce low frequency payload pitch and yaw modes with large acceleration force displacements at the upper end of the payload. This is undesirable because it may cause guidance control system instability.

Launch vehicles often have closely spaced flexure modes with frequencies as low as 1 Hz. A payload may have modes with frequencies starting as low as 6 Hz. The isolation of a 6 Hz payload from a 1 Hz launch vehicle is made more feasible using a "whole-spacecraft" acceleration force isolation system design approach.

The force transmission path for both dynamic and acoustic launch loads to the payload through a stiff attachment fitting has a detrimental impact on launch survival and the life cycle performance of the payload. There is a need, therefore, to replace the traditional design approach, which requires structural stiffening and component isolation, on a case-by-case basis with a "whole-spacecraft" isolation approach in the development of a reduced vibration environment for the payload. This would make it possible for several subsystems, such as solar panels and other flexible structures, to be made lighter. This would allow a larger percentage of the payload weight to be dedicated to scientific and commercial equipment. The isolation system also should allow for tuning of the isolator to meet any special design requirements. A whole-spacecraft design approach, furthermore, would reduce weight and cost as well as increase life and reliability.

DISCLOSURE OF THE INVENTION

The invention comprises an isolator assembly that is designed as a coupling between a payload and a launch vehicle. It includes upper and lower interface rings, the upper interface ring being attached to a payload and the lower interface ring being coupled to a launch vehicle. Mounting pads are coupled to the lower interface ring. The upper interface ring is secured to the pads at circumferentially spaced locations.

The payload is joined to the upper interface ring between the location at which the upper interface ring is secured to the pads. Axial acceleration forces are attenuated as the upper interface ring flexes in an axial direction. The upper portion of the isolator assembly provides the interface with the payload that requires protection from launch accelerations. The bottom portion of the isolator assembly provides the interface with the launch vehicle itself. A specially designed flexure feature is incorporated in the upper portion of the isolator assembly, which provides axial flexibility to allow for a reduction in axial response while controlling and restricting lateral or rocking motion.

The improved isolator assembly of the invention consists of a large circular beam that is fastened to four lateral isolator pads. The payload, in turn, is secured to the circular beams at locations intermediate the lateral pad fasteners. This separation of the four isolation pads from the flexible region of the beam allows for vertical stiffness adjustment by changing the relative rotational position or "clocking" angle between the payload attachment points and the pads. By changing the angular position of the attachment points, the desired axial isolation frequency can be selected. The axial isolation frequency can be decreased to a minimum value which occurs when the rotation angle is ±45° from the lateral pads.

The damping that occurs upon axial flexure of the upper beam may be sufficient; but if additional damping is required, that can be added by fabricating the circular beam as a lamination of concentric beams separated by a suitable material that provides damping, such as an adhesive, a polymer, or a visco-elastic material.

Although the damping system of the invention is designed to attenuate vertical acceleration experienced by payloads mounted on launch vehicles, it may be useful also in reducing shocks during ground transport.

The reduction in the vibration loads due to the improved vibration isolator of the invention increases the reliability of payload components and allows increased use of commercial off-the-shelf components, which are significantly less expensive. The mass or weight savings that can be realized by using the improved vibration isolator of the invention can make it possible to use increased altitude control fuel, which is usually the factor that sets the life of many communication satellites.

Although an embodiment of this invention is disclosed, the disclosure should not be construed to limit the scope of the invention. It is anticipated that various modifications and alternative designs may be made without departing from the scope of the invention.

BRIEF DESCRIPTION OF THE DRAWINGS

FIG. 2 is an isometric view of the payload attachment fitting, which has an inherent axial vibration isolator feature;

FIG. 3 is a detailed view showing a modified construction of the axial isolator ring; and FIG. 4 is a plot of the axial isolation frequency of the upper interface ring of the isolator assembly of FIG. 2 versus the clocking angle for the payload attachment to the interface ring.

BEST MODE FOR CARRYING OUT THE INVENTION

Figure 1:
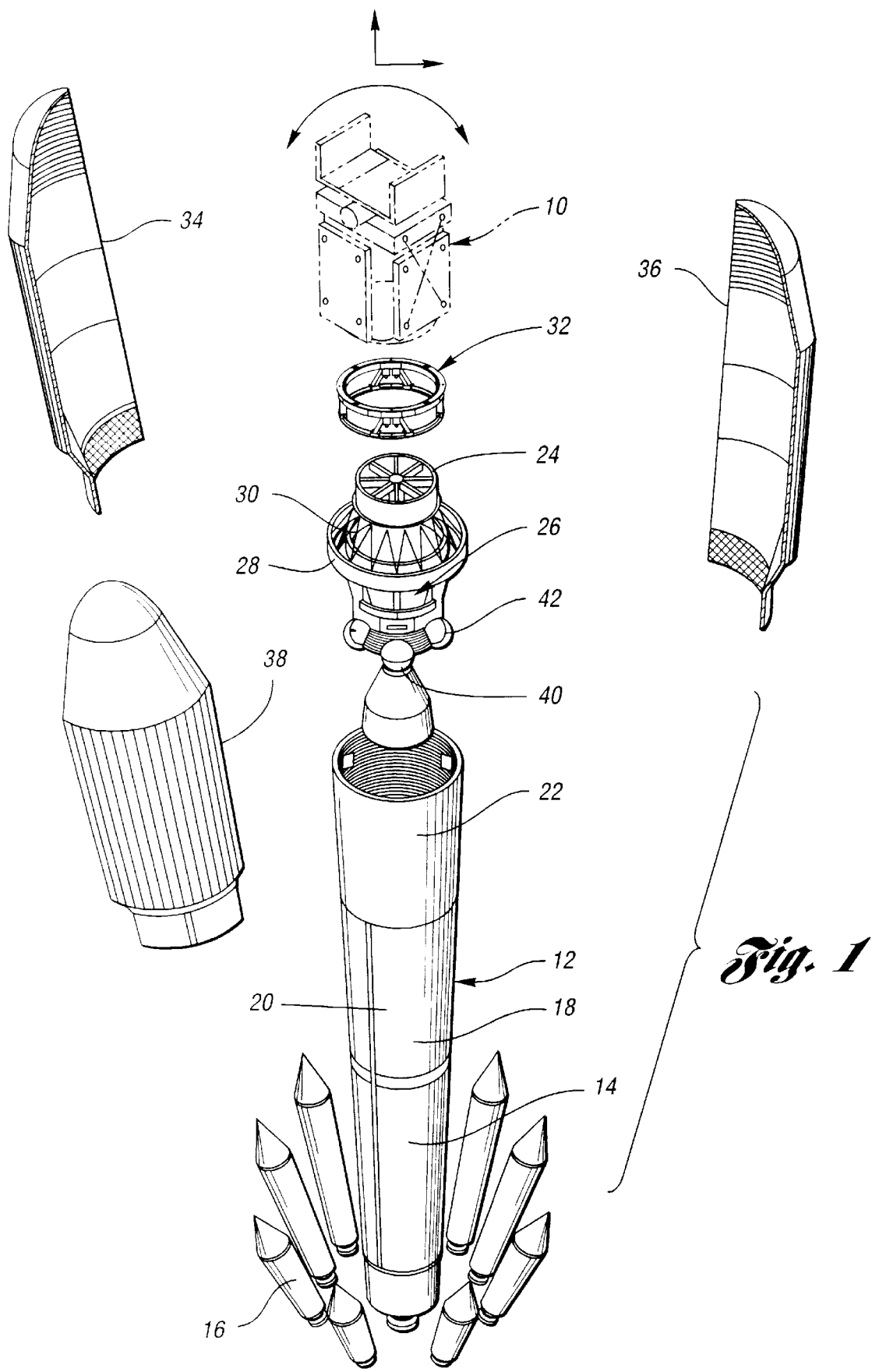
FIG. 1 is a schematic, exploded view of a launch vehicle and a payload that is capable of using the payload attachment fitting assembly of the invention.

FIG. 1 shows in isometric form an exploded view of a typical payload and launch vehicle that may embody the invention. The payload is shown at 10, and the launch vehicle is generally indicated at 12. These are described here because they are representative of any of a variety of payload and launch vehicle systems that may include the isolator feature of the invention.

One embodiment of a launch vehicle comprises a first stage fuel oxidizer tank 14, below which may be mounted thrust augmentation solid fuel thrusters 16. A first stage fuel tank 18 is separated from the oxidizer tank 14 by a center body section 20.

An upper stage for the launch vehicle is shown at 22. The guidance electronics for the vehicle is shown at 24. It is mounted on a second stage 26 which includes a miniskirt 28 and support truss 30.

The payload attachment fitting 32 secures the payload 10 to the second stage of the launch vehicle. During the launch, the payload is surrounded by a fairing indicated at 38. Although a three-piece fairing is illustrated, other fairing designs may be used as well. When the fairing sections are assembled around the spacecraft, they form a protective cone which is ejected when the payload is in orbit.

The second stage of the launch vehicle may include a spherical nitrogen container 40 and a plurality of spherical helium containers 42. The design of the second stage illustrated in FIG. 1 should be considered to be representative of a variety of second stage designs that could be used.

The force vectors for the forces acting on the space vehicle are shown in FIG. 1. These include rotational moment vectors as well as axial and lateral force vectors. These vectors are illustrated in FIG. 1.

The payload attachment fitting is shown in FIG. 2. It comprises a lower interface ring 44 which is adapted to be interfaced with the second stage 26 of the launch vehicle. The interface also includes an intermediate circular interface member 46 which defines an open, circular channel, the upper side of the channel being open. The interface member 46 is supported on the lower interface ring 44 by four pairs of struts 48.

Laterally isolated pads 50 are disposed in the channel opening of the interface member 46. This feature is not part of the present invention, although it is mentioned here merely for the purpose of describing a structural environment of the invention.

The present invention is concerned principally with a vibration isolator capable of attenuating axial or vertical vibration energy. This is achieved by the upper interface ring, 54 which is secured to the pads 50 by fastening bolts or other suitable fastening devices. In the embodiment shown in FIG. 2, bolt openings are shown at attachment points 56, which accommodate the fasteners that extend into the pads 50. The payload is attached to the interface ring 54 at four spaced locations 60. These locations are displaced 90°, one with respect to the other. They are located generally intermediate the attachment points 56.

As seen in the schematic view of FIG. 2, the upper surfaces 62 of the pads 50 are located above the top 64 of the interface member 46. When an axial force is applied to the interface ring 54 at the locations 60, the interface ring therefore will deflect axially. When axial vibration forces are developed in the launch vehicle, they are attenuated because of the axial compliance of the interface ring at the attachment points 60 for the payload.

The so-called clocking angle $\alpha$, as shown in FIG. 2, will determine the degree of compliance. The clocking angle is the angle between the fixed points 56, where the attachment to the pads 50 occurs, and the points 60 where the attachment to the payload occurs. If the angle $\alpha$ is 45°, the compliance is a maximum. This characteristic is plotted in FIG. 4, where the axial isolation frequency is plotted on the ordinate and the angle a is plotted on the abscissa. The angle a can be varied depending on the characteristics of the particular payload/launch vehicle application.

The bending characteristics of the interface ring 54 has an inherent damping quality. The damping characteristics can be enhanced, however, by forming the interface ring 54 in stacked sections, as indicated in FIG. 3. The upper surface of the interface ring 54 is separated in the construction of FIG. 3 from the lower surface 58 by an adhesive material that is yieldable and that has inherent hysteresis qualities. The upper surface and the lower surface form a sandwich construction. A viscous elastic or polymer material also may be used to improve the vibration damping qualities of the interface spring 54.

The foregoing disclosure of the invention is not intended to be exclusive of design variations or modifications that would be apparent to persons skilled in this art. All such variations or modifications, as well as equivalents thereof, are intended to be included within the scope of the following claims.

What is claimed is:

1. A vibration isolator for coupling a payload to a launch vehicle comprising upper and lower interface rings, the upper interface ring being attached to the payload, the lower interface ring being coupled to the launch vehicle;

mounting pads coupled to the lower interface ring, the upper interface ring being secured to the pads at multiple circumferentially spaced locations;

the payload being joined to the upper interface ring at circumferentially spaced locations between the multiple circumferentially spaced locations whereby the upper interface ring flexes in an axial direction thereby attenuating acceleration force distribution from the launch vehicle to the payload.

2. The vibration isolator as set forth in claim 1 wherein the multiple circumferential locations of the joinder of the payload to the upper interface ring are chosen to effect optimum attenuation of acceleration forces for given design criteria.

3. The vibration isolator as set forth in claim 1 wherein the lower interface ring is coupled to the mounting pads by a circular interface member to which the upper interface ring is secured, multiple struts connecting the circular interface member to the lower interface ring.

4. The vibration isolator as set forth in claim 1 wherein the upper interface ring comprises axially stacked sections that are separated by a yieldable material to provide inherent hysteresis qualities during attenuation of axial acceleration forces transmitted from the launch vehicle to the payload.

5. The vibration isolator as set forth in claim 2 wherein the upper interface ring comprises axially stacked sections that are separated by a yieldable material to provide inherent hysteresis qualities during attenuation of axial acceleration forces transmitted from the launch vehicle to the payload.

\* \* \* \* \*